United States Patent
Navarrete Michelini et al.

(10) Patent No.: US 11,620,496 B2
(45) Date of Patent: Apr. 4, 2023

(54) CONVOLUTIONAL NEURAL NETWORK, AND PROCESSING METHOD, PROCESSING DEVICE, PROCESSING SYSTEM AND MEDIUM FOR THE SAME

(71) Applicant: BOE TECHNOLOGY GROUP CO., LTD., Beijing (CN)

(72) Inventors: Pablo Navarrete Michelini, Beijing (CN); Hanwen Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 1302 days.

(21) Appl. No.: 16/069,376

(22) PCT Filed: Nov. 17, 2017

(86) PCT No.: PCT/CN2017/111617
§ 371 (c)(1),
(2) Date: Jul. 11, 2018

(87) PCT Pub. No.: WO2018/153128
PCT Pub. Date: Aug. 30, 2018

(65) Prior Publication Data
US 2021/0209448 A1 Jul. 8, 2021

(30) Foreign Application Priority Data
Feb. 21, 2017 (CN) .......................... 201710094069.9

(51) Int. Cl.
G06N 3/00 (2006.01)
G06N 3/04 (2023.01)
(52) U.S. Cl.
CPC .................... G06N 3/0454 (2013.01)
(58) Field of Classification Search
CPC .............. G06N 3/0454; G06N 3/0481
(Continued)

(56) References Cited

U.S. PATENT DOCUMENTS 9,723,144 B1 * 8/2017 Gao .................... H04M 3/5238
2016/0360202 A1 * 12/2016 Xu ........................ H04N 19/103
(Continued)

FOREIGN PATENT DOCUMENTS

CN 106326939 A * 1/2017 ............... G06K 9/66
CN 106326939 A 1/2017
(Continued)

OTHER PUBLICATIONS

Matthew D. Zeiler, et al., "Visualizing and Understanding Convolutional Networks", European Conference on Computer Vision ECCV; 2014; Computer Vision; pp. 818-833 (Year: 2014).*
(Continued)

*Primary Examiner* — Van D Huynh

(57) ABSTRACT

A convolutional neural network, and a processing method, a processing device, a processing system and a medium for the same. The method includes: using an activation recorder layer as an activation function layer in the convolutional neural network, wherein in response to that a probe image with contents is inputted to the convolutional neural network, the activation recorder layer performs an activation operation the same as the activation function layer does and records an activation result of the activation operation; modifying the convolutional neural network, wherein step of modifying includes replacing the activation recorder layer with a hidden layer that uses the recorded activation result; and inputting an analysis image to the modified convolutional neural network as an input image, so as to output an output image of the modified convolutional neural network, thereby analyzing a forward effect or a backward effect between the input image and the output image, the analysis image being a pixel-level binary image.

20 Claims, 12 Drawing Sheets

(58) Field of Classification Search
USPC .......................................................... 706/26
See application file for complete search history.

(56) References Cited

U.S. PATENT DOCUMENTS

2018/0137857 A1* 5/2018 Zhou .................. G10L 15/16
2018/0315165 A1 11/2018 Navarrete Michelini et al.

FOREIGN PATENT DOCUMENTS

| CN | 106355244 A | 1/2017 |
|----|-------------|--------|
| CN | 107124609 A | 9/2017 |
| RU | 2 579 958 C1 | 4/2016 |

OTHER PUBLICATIONS

Matthew D. Zeiler, et al., "Visualizing and Understanding Convolutional Networks", European Conference on Computer Vision ECCV; 2014; Computer Vision; pp. 818-833.

Karen Simonyan, et al; "Deep Inside Convolutional Networks: Visualising Image Classification Models and Saliency Maps", Computer Science, Computer Vision and Pattern Recognition; arXiv:1312.6034v2 [cs.Cv], Apr. 19, 2014; pp. 1-8.

I. Selesnick; "EL 713 Lecture Notes", Found at eeweb.poly.edu/iselesni/EL713/zoom/mrate.pdf; 32 pages; No date given.

Martin Vetterli, et al; "Wavelets and Subband Coding", Originally published in 1995 by Prentice Hall PTR, Reissued by the authors in 2007. 522 pages.

The First Chinese Office Action dated Jul. 19, 2021; Appln. No. 201710094069.9.

* cited by examiner

700

S303-1

CONVOLUTIONAL NEURAL NETWORK, AND PROCESSING METHOD, PROCESSING DEVICE, PROCESSING SYSTEM AND MEDIUM FOR THE SAME

This patent application claims priority of the Chinese Patent Application No. 201710094069.9 filed on Feb. 21, 2017, the entire disclosure of which is hereby incorporated in full text by reference as part of this application.

TECHNICAL FIELD

Embodiments of the present disclosure relate to the field of image processing technology, and more particularly, to a convolutional neural network, and a processing method, a processing device, a processing system and a medium for the same.

BACKGROUND

Currently, deep learning techniques based on artificial neural networks have made great progress in areas such as image classification, image capture and search, facial recognition, age and speech recognition. Convolutional Neural Network (CNN) is an artificial neural network that has been developed in recent years and attracts much attention. CNN is a special image recognition method and belongs to a very effective network with forward feedback. Now, the range applying CNN has not only been limited to the field of image recognition, it may also be applied to such application directions as face recognition, character recognition and image processing etc.

SUMMARY

At least one embodiment of the present disclosure provides a processing method for a convolutional neural network, comprising steps of: using an activation recorder layer as an activation function layer in the convolutional neural network, wherein in response to that a probe image with contents is inputted to the convolutional neural network, the activation recorder layer performs an activation operation the same as the activation function layer does and records an activation result of the activation operation; modifying the convolutional neural network, wherein step of the modifying comprises replacing the activation recorder layer with a hidden layer that uses the recorded activation result; and inputting an analysis image to the modified convolutional neural network as an input image, so as to output an output image of the modified convolutional neural network, thereby analyzing a forward effect or a backward effect between the input image and the output image, the analysis image being a pixel-level binary image.

As an example, step of inputting an analysis image to the modified convolutional neural network as an input image, so as to obtain an analysis result, thereby analyzing a forward effect between the input image and the output image of the convolutional neural network before modification comprises: inputting an all-zero image to the modified convolutional neural network so as to output a first output value as a bias coefficient; inputting one or more analysis images to the modified convolutional neural network so as to output an output image of the modified convolutional neural network based on the bias coefficient, the analysis image being a binary image that is 1 at a certain pixel and 0 at other pixels; and analyzing correspondence between the analysis image and the output image at a pixel level, so as to obtain the effect of respective pixels of the input image of the modified convolutional neural network on respective pixels of the output image as a forward effect.

In an example, the convolutional neural network comprises an upsampling layer.

In an example, step of inputting an analysis image to the modified convolutional neural network as an input image, so as to obtain an analysis result, thereby analyzing a backward effect between the input image and the output image of the convolutional neural network before modification comprises: inputting an all-zero image to the modified convolutional neural network to output a first output value as a bias coefficient; inputting all possible different analysis images to the modified convolutional neural network to output an output image of the modified convolutional neural network based on the bias coefficient, the analysis image being a binary image that is 1 at a certain pixel and 0 at other pixels, and positions of the pixel that is 1 being different in different analysis images; and analyzing correspondence between the analysis image and the output image at a pixel level, so as to obtain the effect of respective pixels of the output image of the convolutional neural network on respective pixels of the input image as a backward effect.

In an example, step of modifying the convolutional neural network comprises replacing the activation recorder layer with a hidden layer that uses the recorded activation result comprises: configuring a deconvolutional network as the modified convolutional neural network, the deconvolutional network being an inverse network of the convolutional neural network. The step of inputting an analysis image to the modified convolutional neural network as an input image, so as to obtain an analysis result, thereby analyzing a backward effect between the input image and the output image of the convolutional neural network before modification comprises: inputting an all-zero image to the modified convolutional neural network so as to output a first output value as a bias coefficient; inputting one or more analysis images to the modified convolutional neural network so as to output an output image of the modified convolutional neural network based on the bias coefficient, the analysis image being a binary image that is 1 at a certain pixel and 0 at other pixels; and analyzing correspondence between the analysis image and the output image at a pixel level, so as to obtain the effect of respective pixels of the input image of the modified convolutional neural network on respective pixels of the output image as a backward effect.

In an example, the convolutional neural network comprises an upsampling layer, and configuring a deconvolutional network as the modified convolutional neural network comprises: replacing the upsampling layer with a downsampling layer corresponding to the upsampling layer.

At least one embodiment of the present disclosure provides a processing device for a convolutional neural network, comprising: a recorder configured to use an activation recorder layer as an activation function layer in the convolutional neural network, wherein in response to that a probe image with contents is inputted to the convolutional neural network, the recorder enables the activation recorder layer to perform an activation operation the same as the activation function layer does and records an activation result of the activation operation; a modifier, configured to modify the convolutional neural network, wherein step of modifying comprises replacing the activation recorder layer with a hidden layer that uses the recorded activation result; and an analyzer, configured to input an analysis image to the modified convolutional neural network as an input image, so as to output an output image of the modified convolutional neural network, thereby analyzing a forward effect or a backward effect between the input image and the output image, the analysis image being a pixel-level binary image.

In an example, the analyzer is configured to: input an all-zero image to the modified convolutional neural network so as to output a first output value as a bias coefficient; input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a forward effect.

In an example, the convolutional neural network comprises an upsampling layer.

In an example, the analyzer is configured to: input an all-zero image to the modified convolutional neural network to output a first output value as a bias coefficient; input all possible different analysis images to the modified convolutional neural network to output an output image of the modified convolutional neural network based on the bias coefficient, the analysis image being a binary image that is 1 at a certain pixel and 0 at other pixels, and positions of the pixel that is 1 being different in different analysis images; and analyze correspondence between the analysis image and the output image at a pixel level, so as to obtain the effect of respective pixels of the output image of the modified convolutional neural network on respective pixels of the input image as a backward effect.

In an example, the modifier is configured to: configure a deconvolutional network as the modified convolutional neural network, the deconvolutional network being an inverse network of the convolutional neural network. The analyzer is configured to: input an all-zero image to the modified convolutional neural network so as to output a first output value as a bias coefficient; input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a backward effect.

In an example, the convolutional neural network comprises an upsampling layer, and the analyzer is configured to configure a deconvolutional network as the modified convolutional neural network through the following step: replacing the upsampling layer with a downsampling layer corresponding to the upsampling layer.

At least one embodiment of the present disclosure provides a processing system for a convolutional neural network, comprising: one or more processors; one or more memories storing computer-readable codes, when the computer-readable codes being capable of causing, when executed by the one or more processors, any of the processing methods in at least one embodiment of the present disclosure.

At least one embodiment of the present disclosure provides a convolutional neural network, comprising: one or more convolutional layers; one or more hidden layers corresponding to the one or more convolutional layers, the one or more hidden layers being used to replace corresponding one or more activation recorder layers, the one or more activation recorder layers serving as an activation function layer in the convolutional neural network, wherein in response to that a probe image with contents is inputted to the convolutional neural network, the one or more activation recorder layers perform an activation operation the same as the activation function layer does and record an activation result of the activation operation, the one or more hidden layers use the recorded activation result; an input terminal, configured to receive one or more analysis images; and on output terminal, configured to output an output image of the modified convolutional neural network, thereby analyzing a forward effect or a backward effect between the input image and the output image, the analysis image being a pixel-level binary image.

In an example, before receiving the analysis images, the input terminal receives an all-zero image so as to output a first output value as a bias coefficient from the output terminal; the input terminal is configured to receive the one or more analysis images so as to output an output image of the modified convolutional neural network from the output terminal based on the bias coefficient, the analysis image being a binary image that is 1 at a certain pixel and 0 at other pixels; and correspondence between the analysis image and the output image at a pixel level is analyzed, so as to obtain the effect of respective pixels of the input image of the modified convolutional neural network on respective pixels of the output image as a forward effect.

In an example, the convolutional neural network further comprises an upsampling layer.

In an example, before receiving the analysis images, the input terminal receives an all-zero image to output a first output value as a bias coefficient from the output terminal; the input terminal receives all possible different analysis images to output an output image of the modified convolutional neural network from the output terminal based on the bias coefficient, the analysis image being a binary image that is 1 at a certain pixel and 0 at other pixels, and positions of the pixel that is 1 being different in different analysis images; and correspondence between the analysis image and the output image at a pixel level is analyzed, so as to obtain the effect of respective pixels of the output image of the convolutional neural network on respective pixels of the input image as a backward effect.

In an example, the convolutional neural network may be replaced with a deconvolutional network as the modified convolutional neural network, the deconvolutional network is an inverse network of the convolutional neural network, the input terminal is replaced with an output terminal of the modified convolutional neural network, and the output terminal is replaced with an input terminal of the modified convolutional neural network; the input terminal of the modified convolutional neural network receives an all-zero image so as to output a first output value as a bias coefficient from the output terminal of the modified convolutional neural network; the input terminal of the modified convolutional neural network receives one or more analysis images so as to output an output image of the modified convolutional neural network based on the bias coefficient, the analysis image being a binary image that is 1 at a certain pixel and 0 at other pixels; and correspondence between the analysis image and the output image at a pixel level is analyzed, so as to obtain the effect of respective pixels of the input image of the modified convolutional neural network on respective pixels of the output image as a backward effect.

In an example, the convolutional neural network further comprises an upsampling layer, wherein the upsampling layer is replaced with a downsampling layer corresponding to the upsampling layer in the deconvolutional network.

At least one embodiment of the present disclosure provides a computer storage medium for storing computer-readable codes capable of causing, when executed by one or more processors, any of the processing methods in at least one embodiment of the present disclosure.

BRIEF DESCRIPTION OF THE DRAWINGS

In order to more clearly illustrate the technical solutions of the embodiments of the present disclosure, the drawings of the embodiments will be described briefly below. Obviously, the drawings in the following description merely relate to some embodiments of the present disclosure, but do not intend to limit the present disclosure.

DETAILED DESCRIPTION OF THE EMBODIMENTS

Hereinafter, for the objectives, the technical solutions and the advantages of the embodiments of the present disclosure to be more clear, the technical solutions in the embodiments of the present disclosure will be described clearly and comprehensively in combination with the drawings. Obviously, these described embodiments are parts of the embodiments of the present disclosure, rather than all of the embodiments thereof. All the other embodiments obtained by those of ordinary skill in the art based on the descripted embodiments of the present disclosure without paying creative efforts fall into the protection scope of the present disclosure.

Unless otherwise defined, technical terms or scientific terms used herein shall have common meanings known by those skilled in the art of the present disclosure. Words and expressions such as "first", "second" and the like used in the specification and claims of the present disclosure do not denote any sequence, quantity or priority, but are used to distinguish different components. Words such as "include", "comprise" and the like refer to that an element or an object before this word contains all the elements or objects listed thereinafter or alternatives thereof, without excluding other elements or objects. Words such as "connected", "connecting" and the like are not restricted to physical or mechanical connections, but may include electrical connections or signal connections, regardless of direct or indirect connections.

The information technology market has made huge investments in deep learning in the past five years. The main purpose of today's technology is to solve artificial intelligence (AI) problems such as: recommendation engine, image classification, image caption and search, facial recognition, age recognition, speech recognition, and so on. In general, deep learning techniques have successfully solved the understanding of similar data, such as describing contents of an image or object conditions in an image hard to recognize, or recognizing speech in a noisy environment. Another advantage of deep learning is its universal structure, which allows relatively similar systems to solve very different problems. Compared with methods in previous generations, neural networks and deep learning structures are much larger in number of filters and layers.

Figure 1:
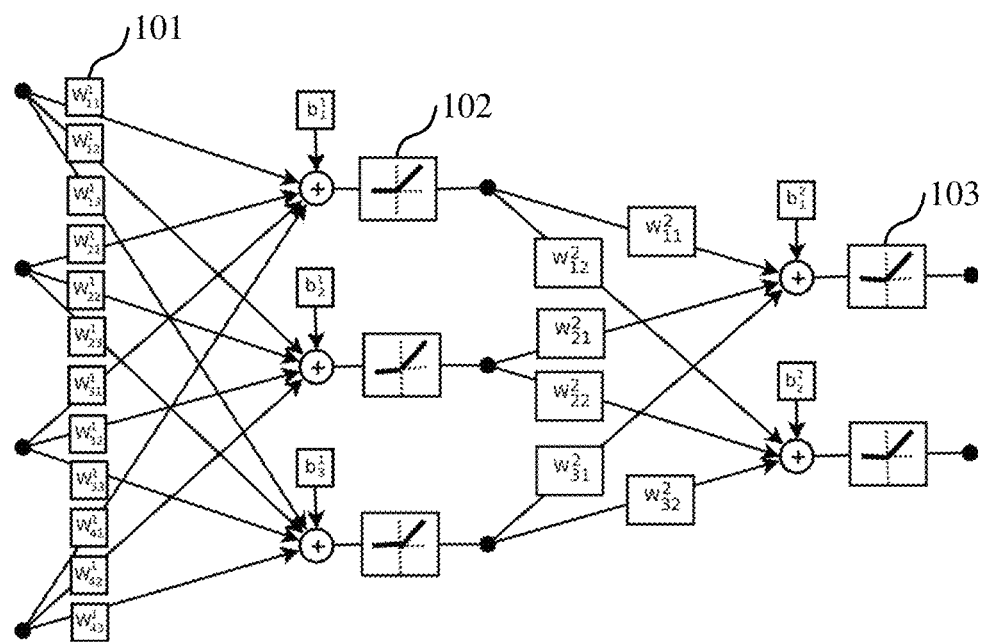
FIG. 1 shows a simple schematic diagram of a convolutional neural network.

A main component of the deep learning system is the convolutional network. The convolutional network is a neural network structure that uses images as input/output and replaces scalar weights with filters (i.e., convolutions). As an example, a simple structure with three layers is shown in FIG. 1. This convolutional neural network is used for example for image processing, using images as input and output, and replacing scalar weights for example with filters (i.e. convolutions). FIG. 1 shows a convolutional neural network with a simple structure of three layers. As shown in FIG. 1, this structure acquires four input images at four input terminals on the left, has three units (output images) in a hidden layer at the center, and has two units in an output layer to generate two output images. Each box with a weight $w_{ij}^k$ corresponds to a filter (e.g., a 3×3 or 5×5 kernel), where k is a tag that indicates a serial number of an input layer, and i and j are tags that indicate the input and output units respectively. The bias $b_i^k$ is a scalar added to outputs of convolutions. A result for adding several convolutions and biases is then passed through an activation box, the activation box usually corresponds to a rectifying linear unit (ReLU) or a sigmoid function or a hyperbolic tangent or the like. Filters and biases are fixed during an operating period of the system, and obtained through a training process on a set of input/output example images, and adjusted to fit some optimization criteria depending on an application. A typical configuration involves one tenth or hundreds of filters in each layer. A network with three layers is considered to be shallow, while a network with a number of layers greater than five or ten is generally considered to be deep.

Figure 2:
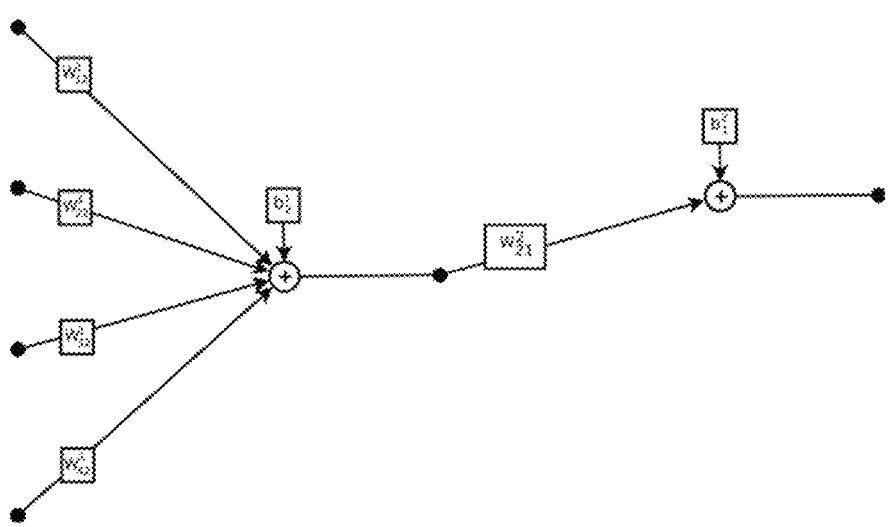
FIG. 2 shows an example of a small number of filters that are equivalent to an activation result of an activation function in a convolutional neural network.

The convolutional network is a nonlinear system. This non-linearity is due to the activation function which prevents the entire system from being reduced to a small set of filters acting on each input. In the present disclosure, it is convenient to interpret the convolutional network as an adaptive filter. First, it is assumed that the rectifying linear unit (ReLU) serves as the activation function. For a fixed input, some inputs to the activation box will be positive and then passed to the next layer invariably due to a linearity shape of the activation function: and other inputs of the activation box will be negative, thus eliminating any effects on the outputs. An example is shown in FIG. 2. FIG. 2 shows an example of a small number of filters that are equivalent to an activation result of an activation function in a convolutional neural network. It is assumed that a specific input to a second ReLU in the first layer and a first ReLU in the second layer is activated. For this specific input, inputs to other ReLUs are negative and thus can be omitted in FIG. 2 because they do not affect the outputs. The resulting system is linear and can be reduced to four different filters and biases applied to each input. The same is true for different inputs, but an activation state of respective ReLUs will change along with different inputs, thus changing a result of a single filter. Thereafter, for any input, a net effect of the system is always equivalent to a small set of filters plus biases (such as a set of filters plus biases shown in FIG. 2), but the filters change along with the inputs, which leads to an adaptive filter effect.

Currently, a main disadvantage of deep learning is difficulty in interpreting parameters of an operating system. A typical use of the deep learning system begins with selection of network architecture, followed by training a model and obtaining a set of parameters (filter coefficients and biases). If the training process is successful, for a given input network, outputs will match a desired goal with high precision, in many cases better than any other methods. But there are many questions that are still difficult to answer, such as: Is the network architecture the best choice for this issue? Is the number of parameters sufficient? Or too much? And, at a more basic level, how do these parameters operate inside the network to obtain outputs? How multiple layers (deep network) helps improving results compared to a few layers (shallow network)?

Filters in a deep network architecture are usually small (3×3 or 5×5), and visualizing a large number of filters one by one does not provide too much insight into the system, and bias is a scalar numeric that gives no clue to complex mechanisms of operations within the network. Understanding the parameters of an operating deep learning system is still an open question largely.

The present disclosure is to introduce, in respective embodiments, a system that allows extension of classical methods for linear systems so as to analyze convolutional networks. A linear system may be fully described by the so-called impulse response. In this specification, impulse response refers to an output of an input that is 1 for a single position but 0 for any other positions. The convolutional network is not a linear system due to the activation function (ReLU). However, according to various embodiments of the present disclosure, it is possible to record and fix the activation state of the ReLU, so that the system becomes linear and may perform an analysis of impulse response.

The impulse response can show the effect of input pixels on output pixels. An opposite relationship may also be obtained using standard methods from a linear system, i.e. which input pixels are used to obtain output pixels, and how important each input pixel is, i.e., the effect of output pixels on input pixels. This can be visualized as an image representing the overall filter effect of the network.

At least one embodiment of the present disclosure provides a convolutional neural network and a processing method, a processing device and a processing system for the same, they can be used to determine the effect generated by a single or several pixels of an input on a produced output (abbreviated as a forward effect), and the effect of how a single or several pixels in the output are affected by an input (abbreviated as a backward effect).

Figure 3:
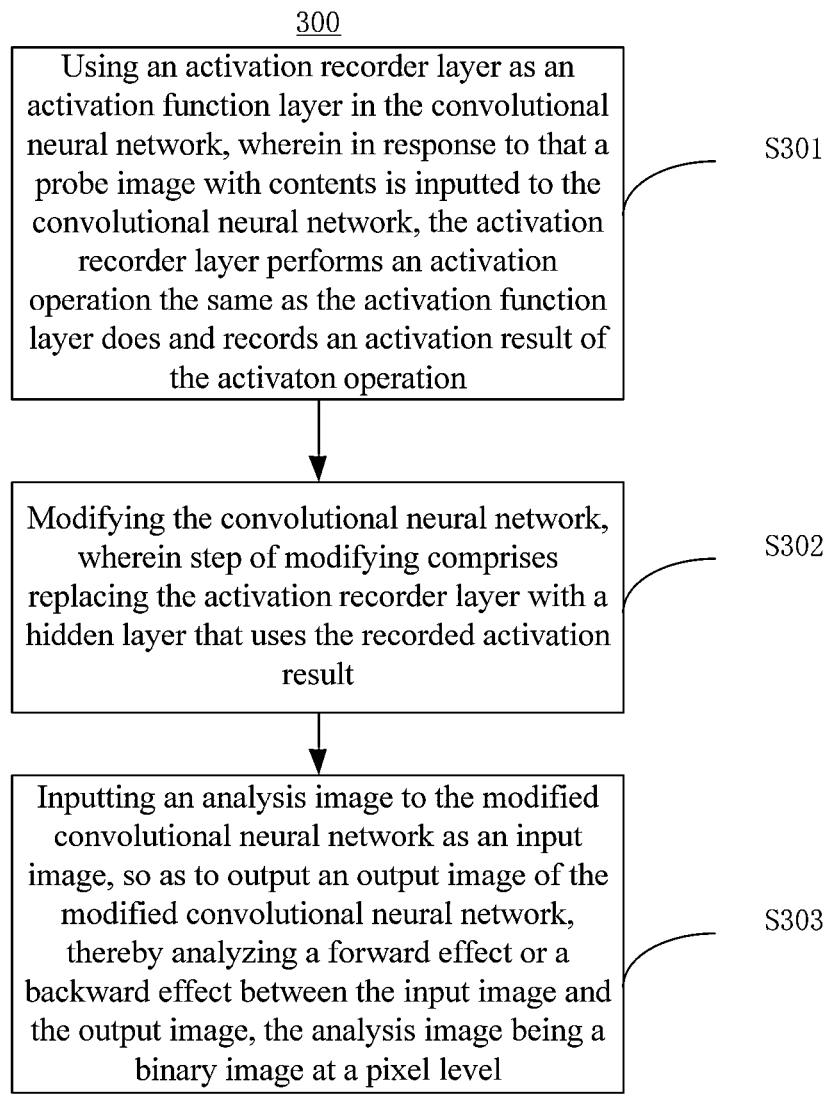
FIG. 3 shows a flowchart of a processing method for a convolutional neural network according to an embodiment of the present disclosure.

FIG. 3 shows a flowchart of a processing method 300 for a convolutional neural network according to an embodiment of the present disclosure.

As shown in FIG. 3, the processing method 300 for a convolutional neural network comprises: step S301, using an activation recorder layer as an activation function layer in the convolutional neural network, wherein in response to that a probe image with contents is inputted to the convolutional neural network, the activation recorder layer performs an activation operation the same as the activation function layer does and records an activation result of the activation operation; step S302, modifying the convolutional neural network, wherein the step of modifying comprises replacing the activation recorder layer with a hidden layer that uses the recorded activation result; and step S303, inputting an analysis image to the modified convolutional neural network as an input image, so as to output an output image of the modified convolutional neural network, thereby analyzing a forward effect or a backward effect between the input image and the output image, the analysis image being a pixel-level binary image.

In this way, the activation recorder layer is used to record the activation result of the activation operation of the activation function layer that originally causes nonlinearity to the convolutional neural network, and the recorded activation result is fixed by the hidden layer, so that the convolutional neural network is modified from nonlinear to linear, this allows for more stably performing subsequent analysis. Further, an analysis image that serves as a binary image of a pixel level is inputted to the modified convolutional neural network, the relationship between the inputted analysis image and the output image may be analyzed at the pixel level, thereby the forward effect or the backward effect between the input image and the output image of the convolutional neural network is obtained, so that guidance can be provided for how to make improvement with respect to the number of filters, parameters, etc. of the convolutional neural network.

In the above, the activation function layer, the activation recorder layer, and the hidden layer are exampled as one. However, the present disclosure is not limited thereto. In fact, the activation function layer, the activation recorder layer, and the hidden layer may be multiple, and they are in one-to-one relationship, i.e., for example, if there are three activation function layers, then there are three activation recorder layers to replace the original three activation function layers correspondingly, and there are three hidden layers to replace the three activation recorder layers correspondingly.

Figure 4:
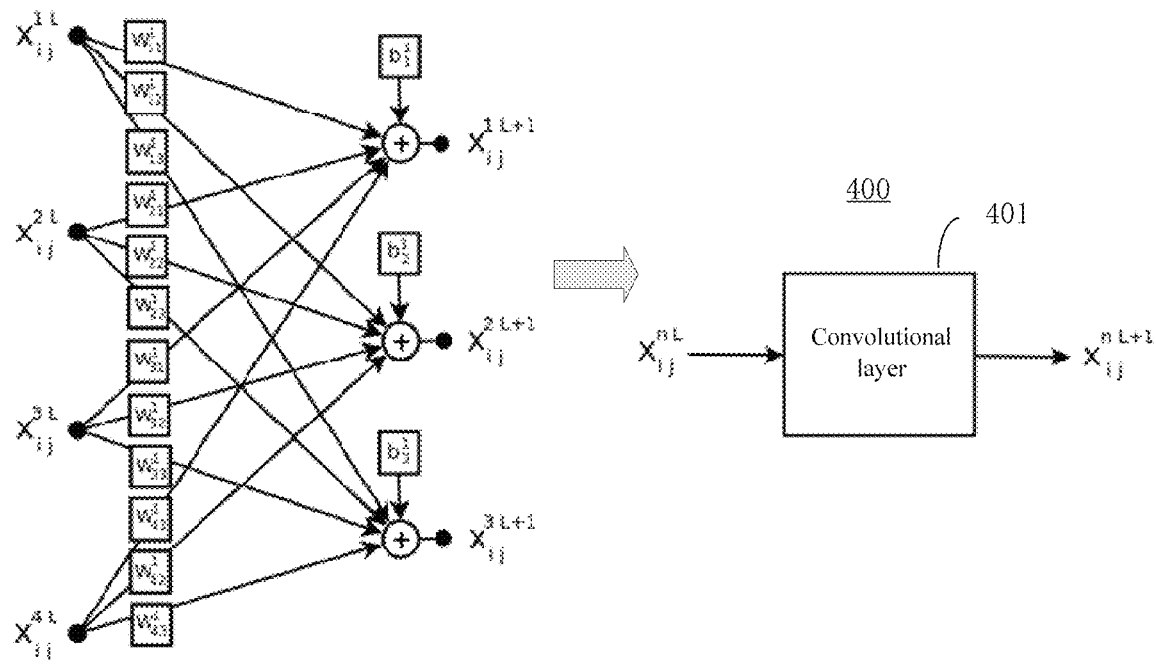
FIG. 4 shows a convolutional layer of a convolutional neural network and its simplified diagram.

FIG. 4 shows a convolutional layer 401 of a convolutional neural network 400 and its simplified diagram.

As shown in the left part of FIG. 4, one convolutional layer 401 in the convolutional neural network 400 is shown, and is simplified to the simplified diagram shown in the right part of FIG. 4. Of course, there may be, and usually is, more than one convolutional layer in the convolutional neural network, which will not be shown here.

Figure 5:
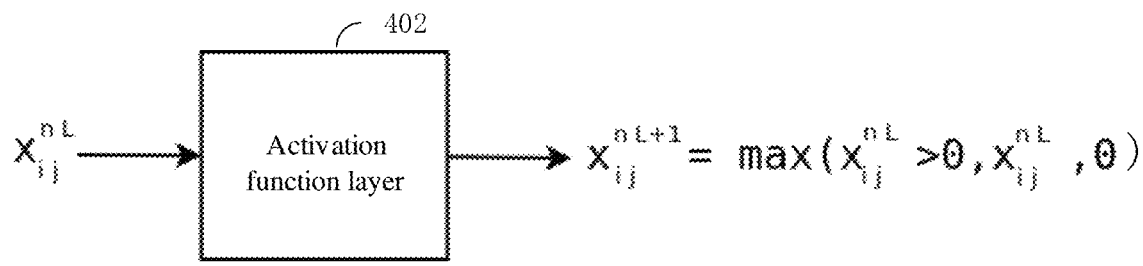
FIG. 5 shows a simplified diagram of an activation function layer of a convolutional neural network.

FIG. 5 shows a simplified diagram of an activation function layer 402 of the convolutional neural network 400.

As shown in FIG. 5, the activation function layer 402 is typically added to the end of the convolutional layer 401 to form the convolutional neural network 400 having the activation function layer 402.

Herein, inputs and outputs of the activation function layer 402 in FIG. 5 adopt the same symbols as those in the convolutional layer in FIG. 4, but it is not limited that inputs and outputs must be the same as those in the convolutional layer in FIG. 4. Accordingly, the symbol L denotes the number of layers, and the number of layers of the convolutional layer and the number of layers of the activation function layer may be different, so it is only necessary to take a different value for L to distinguish the convolutional layer and the activation function layer in the figure.

Figure 6:
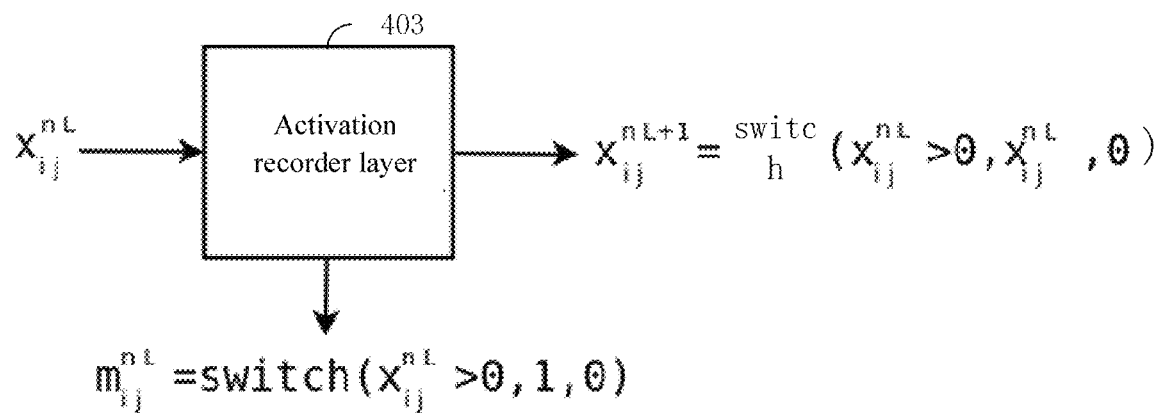
FIG. 6 shows a schematic diagram of step S301 in the processing method shown in FIG. 3.

FIG. 6 shows a schematic diagram of step S301 in the processing method shown in FIG. 3.

In step S301, an activation recorder layer 403 is used as the activation function layer 402 in the convolutional neural network, wherein in response to that a probe image with contents is inputted to the convolutional neural network 400, the activation recorder layer 403 performs an activation operation the same as the activation function layer 402 does and records an activation result of the activation operation, for example, $$x_{ij}^{nL+1} = \max(x_{ij}^{nL} > \theta, x_{ij}^{nL}, \theta,$$

where i, j denote a row number and a column number of a pixel dot of the input image, L denotes an ordinal number of layer, and n denotes an ordinal number of input terminal.

Figure 7:
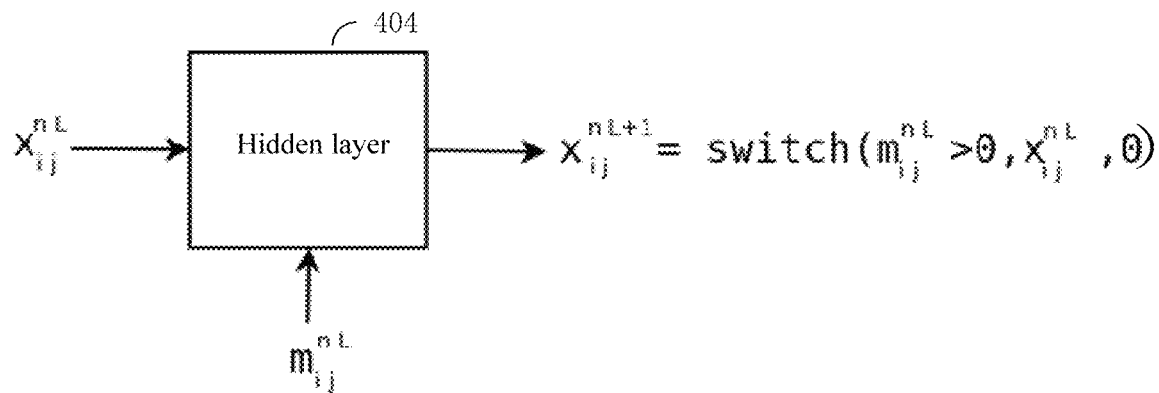
FIG. 7 shows a schematic diagram of step S302 in the processing method shown in FIG. 3.

FIG. 7 shows a schematic diagram of step S302 in the processing method shown in FIG. 3.

In step S302, the convolutional neural network 400 is modified, wherein the step of modifying comprises replacing the activation recorder layer 403 with a hidden layer 404 that uses the recorded activation result, for example, $$m_{ij}^{nL} = \text{switch}(x_{ij}^{nL} > \theta, 1, \theta).$$

In this way, a modified convolutional neural network 700 is obtained. It is assumed that the modified convolutional neural network 700 will be denoted as S, so that an output y obtained from the modified convolutional neural network 700 by inputting x may be written as y=S(x).

Figure 8:
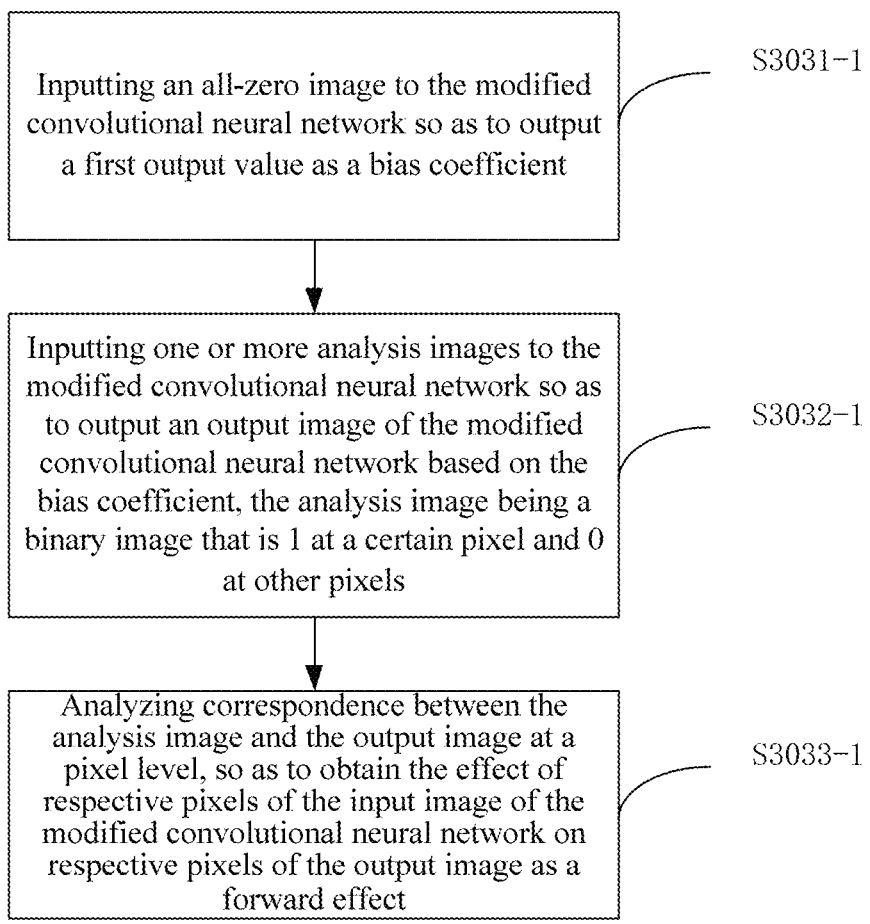
FIG. 8 shows an embodiment of step S303 in the processing method shown in FIG. 3.

FIG. 8 shows an embodiment (step S303-1) of step S303 in the processing method shown in FIG. 3.

This embodiment is an embodiment of analyzing the effect of respective pixels of the input image on respective pixels of the output image as a forward effect.

Specifically, step S303-1 comprises: step S3031-1, inputting an all-zero image to the modified convolutional neural network 700 so as to output a first output value as a bias coefficient; step S3031-2, inputting one or more analysis images to the modified convolutional neural network 700 so as to output an output image of the modified convolutional neural network 700 based on the bias coefficient, the analysis image being a binary image that is 1 at a certain pixel and 0 at other pixels; and step S3031-3, analyzing correspondence between the analysis image and the output image at a pixel level, so as to obtain the effect of respective pixels of the input image of the modified convolutional neural network 400 on respective pixels of the output image as a forward effect.

Specifically, in step S3031-1, this bias coefficient $b_{\text{eff}}[p,q]$ is an output for a zero input 0 (an all-zero image whose all input values are equal to zero), and indicates an overall contribution of the bias coefficient $b_{\text{eff}}[p,q]$ to the output value:

$$b_{\text{eff}}[p,q]=S(0)$$

where p, q indicate a row number and a column number of a pixel dot of the output image.

In step S3031-2, the following analysis image $\delta^{n,m}[i,j]$ is again inputted:

$$\delta^{n,m}[i, j] = \begin{Bmatrix} 1 & \text{if } i=n \wedge j=m \\ 0 & \text{other pixel dots} \end{Bmatrix}$$

Hence, based on the bias coefficient $b_{\text{eff}}$ obtained in step S3031-1, the following output image $h^{n,m}[p,q]$ is obtained:

$$h^{n,m}[p,q]=S(\delta^{n,m})-b_{\text{eff}}$$

$h^{n,m}[p,q]$ indicates a contribution made by a certain input pixel (n, m) on an output pixel (p, q), that is the forward effect. This is similar to the concept of "pulse response" in the linear system.

Herein, the above examples describe the case where it is desired to analyze the forward effect of a particular pixel (n, m) in the input image on the output, but the embodiment is not limited thereto, and actually, it is also possible to analyze the forward effect of some (not one) specific pixels in the input image on the output, the method is similar to that described above, it is only necessary to change the analysis image to a binary image that is 1 at some specific pixels and 0 at other pixels.

Herein, in order to analyze output images of several types of analysis images, it is possible to input said several types of analysis images for several times, it is not necessary to store all possible analysis images, such as a large number of analysis images in which a pixel dot that is 1 may be in all positions in the analysis images, thus storage space and system resources can be saved.

In this way, by further analyzing the contribution made by the input to the output, guidance is provided for how to make improvement with respect to the number of filters, parameters, etc. of the convolutional neural network.

In summary, by inputting the analysis image that serves as a pixel-level binary image to the modified convolutional neural network, the relationship between the inputted analysis image and the output image can be analyzed at the pixel level to obtain the forward effect between the input image and the output image for the convolutional neural network, thereby providing guidance for how to make improvement with respect to the number of filters, parameters, etc. of the convolutional neural network.

Figure 9:
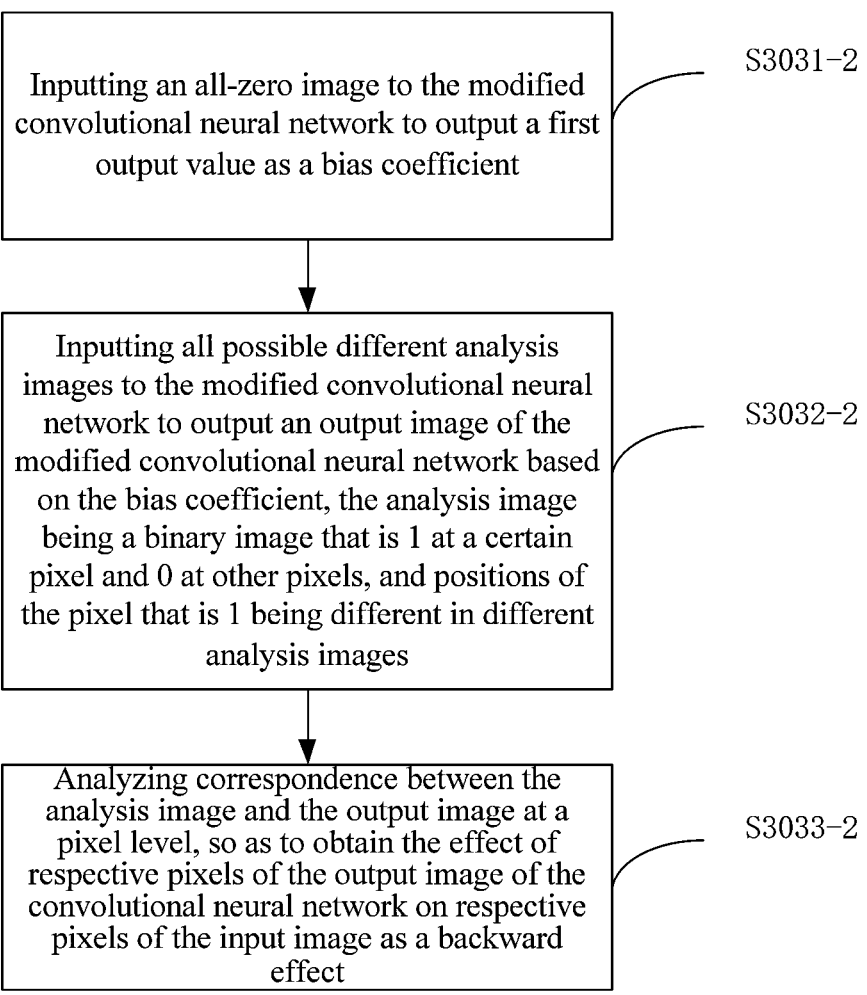
FIG. 9 shows another embodiment of step S303 in the processing method shown in FIG. 3.

FIG. 9 shows another embodiment step S303-2 of step S303 in the processing method shown in FIG. 3.

This embodiment is an embodiment of analyzing the effect of respective pixels of the output image on respective pixels of the input image as a backward effect.

Specifically, step S303-2 comprises: step S3031-2, inputting an all-zero image to the modified convolutional neural network 700 to output a first output value as a bias coefficient; step S3032-2, inputting all possible different analysis images to the modified convolutional neural network 700 to output an output image of the modified convolutional neural network 700 based on the bias coefficient, the analysis image being a binary image that is 1 at a certain pixel and 0 at other pixels, and positions of the pixel that is 1 being different in different analysis images; and step S3033-2, analyzing correspondence between the analysis image and the output image at a pixel level, so as to obtain the effect of respective pixels of the output image of the convolutional neural network 400 on respective pixels of the input image as a backward effect.

Herein, unlike step S303-1, when analyzing the backward effect, if it is desired to know, based on a certain type of output image, how the output image is affected by the input image, since it is not known beforehand the output image is obtained from which one or ones of input images, all possible different analysis images may be inputted (a case where all pixels (n, m) are 1) to obtain all output images $H^{p,q}[n,m]$. Here $H^{p,q}[n,m]$ indicates the contribution made by a certain output pixel (p, q) to an input image (n, m), it is the same as the $h^{n,m}[p,q]$ in essence as described in FIG. 8, because they are both obtained by using the same convolutional neural network, only the analysis angle and application are different. Thus, respective input images corresponding to a certain output image desired to be analyzed are obtained, so that the effect made by one or some pixels of the output image on respective pixels of the input image is obtained as a backward effect.

Different from step S303-1 shown in FIG. 8, in this embodiment, all possible different analysis images and all output images probably need to be stored, and the operation by the modified convolutional neural network 700 may be performed several times in advance. Configuration and modification of the convolutional neural network of this embodiment is similar to step S303-1 shown in FIG. 8, thus the processing on the convolutional neural network itself is relatively simple.

Such embodiment can be generally applied to applications such as machine identification, machine classification, and the like. Because, in such applications, more attention is paid to how the results of machine recognition, machine classification, etc. are affected by the input image, or the result can be outputted from what input image or which ones of the input images (which pixel dots) etc. For example, if the result of machine recognition, machine classification, etc. is a flower, it is usually desired to know which type of input image or which of the input images (which pixel dots) can obtain the result of one flower.

In summary, various output images are obtained by inputting various types of analysis images that serve as pixel-level binary images to the modified convolutional neural network, the relationship between a certain output image and its corresponding analysis image can be analyzed at the pixel level. Thus, the backward effect between the output image and the input image for the convolutional neural network is obtained, thereby guidance is provided for how to make improvement with respect to the number of filters, parameters, and the like of the convolutional neural network.

Figure 10A:
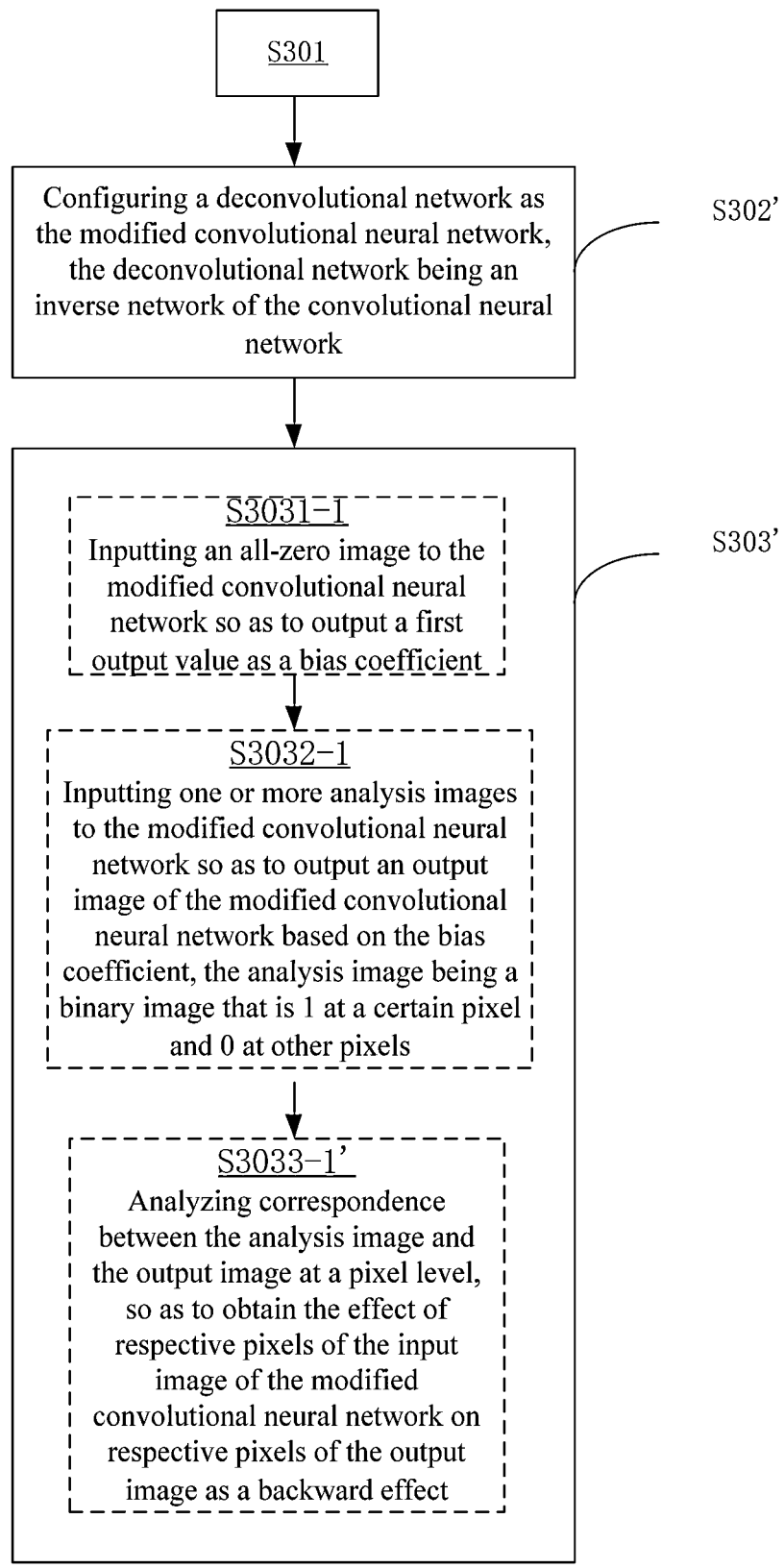
FIG. 10A shows still another embodiment of step S302 and step S303 in the processing method shown in FIG. 3.

FIG. 10A shows still another embodiment steps S302' and S303' of step S302 and step S303 in the processing method shown in FIG. 3.

This embodiment is another embodiment of analyzing the effect of respective pixels of the output image on respective pixels of the input image as a backward effect.

Specifically, in step 302', a deconvolutional network is configured as the modified convolutional neural network 700-1, wherein the deconvolutional network is an inverse network of the convolutional neural network 400. For example, a convolutional layer becomes a deconvolutional layer, a pooling layer becomes an unpooling layer, and the activation function in the hidden layer does not change, and so on. Specific process of deconvolutional network is commonly known in the art, no more details are repeated here. As such, step S303' comprises: step S3031-1, inputting an all-zero image 0 to the modified convolutional neural network 700-1 so as to output a first output value as a bias coefficient $B_{eff}[n,m]=S(0)$; step S3032-1, inputting one or more analysis images to the modified convolutional neural network 700-1, for example:

$$\delta^{i,j}[n, m] = \left\{ \begin{array}{ll} 1 & \text{if } n = i \wedge m = j \\ 0 & \text{other pixel dots} \end{array} \right\}$$

so as to output an output image $H^{p,q}[n,m]=S(\delta^{i,j})-b_{eff}$ of the modified convolutional neural network 700-1 based on the bias coefficient $B_{eff}[n,m]$, the analysis image being a binary image that is 1 at a certain pixel and 0 at other pixels; and step S3033-1', analyzing correspondence between the analysis image $\delta_{i,j}[n,m]$ and the output image $H^{p,q}[n,m]$ at a pixel level, so as to obtain the effect of respective pixels of the input image of the modified convolutional neural network 700-1 on respective pixels of the output image as a backward effect.

Figure 10B:
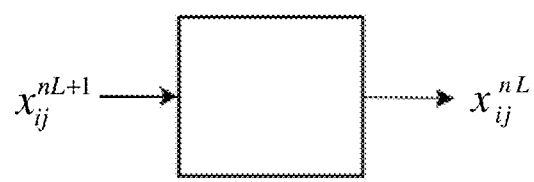
FIG. 10B shows an exemplary diagram of a modified convolutional neural network.

Herein, step S303' is substantially similar to the step and the principle of step S303-1 shown in FIG. 8, except that the backward effect is obtained in step S3033-1', no more details are repeated here. Herein, in step S302', the modified convolutional neural network 700 is replaced with the deconvolutional network 700-1. The deconvolutional network may be understood as an inverse of convolutional neural network. Therefore, the input of the deconvolutional network 700-1 corresponds to the output of the original convolutional neural network 700 before replacement, and the output of the deconvolutional network 700-1 corresponds to the output of original convolutional neural network 700 before replacement, referring to FIG. 10B. FIG. 10B shows an exemplary diagram of the modified convolutional neural network. Therefore, in order to analyze the effect caused by a certain output image of the original pre-replacement convolutional neural network 700 on the input image, it is only needs to use the certain output image as the input of the deconvolutional network 700-1.

This embodiment can avoid storing all possible different analysis images and all output images in the embodiment as shown in FIG. 9, and does not need the operation of the modified convolutional neural network 700 several times in advance, but this embodiment needs to perform deconvolution on the original convolutional neural network 700 to obtain the corresponding deconvolutional neural network.

In summary, the relationship between a certain output image and its corresponding analysis image can be analyzed at a pixel level so as to obtain the backward effect between the output image and the input image for the original convolutional neural network, thereby guidance is provided for how to make improvement with respect to the number of filters, parameters, etc. of the neural network.

Figure 11A:
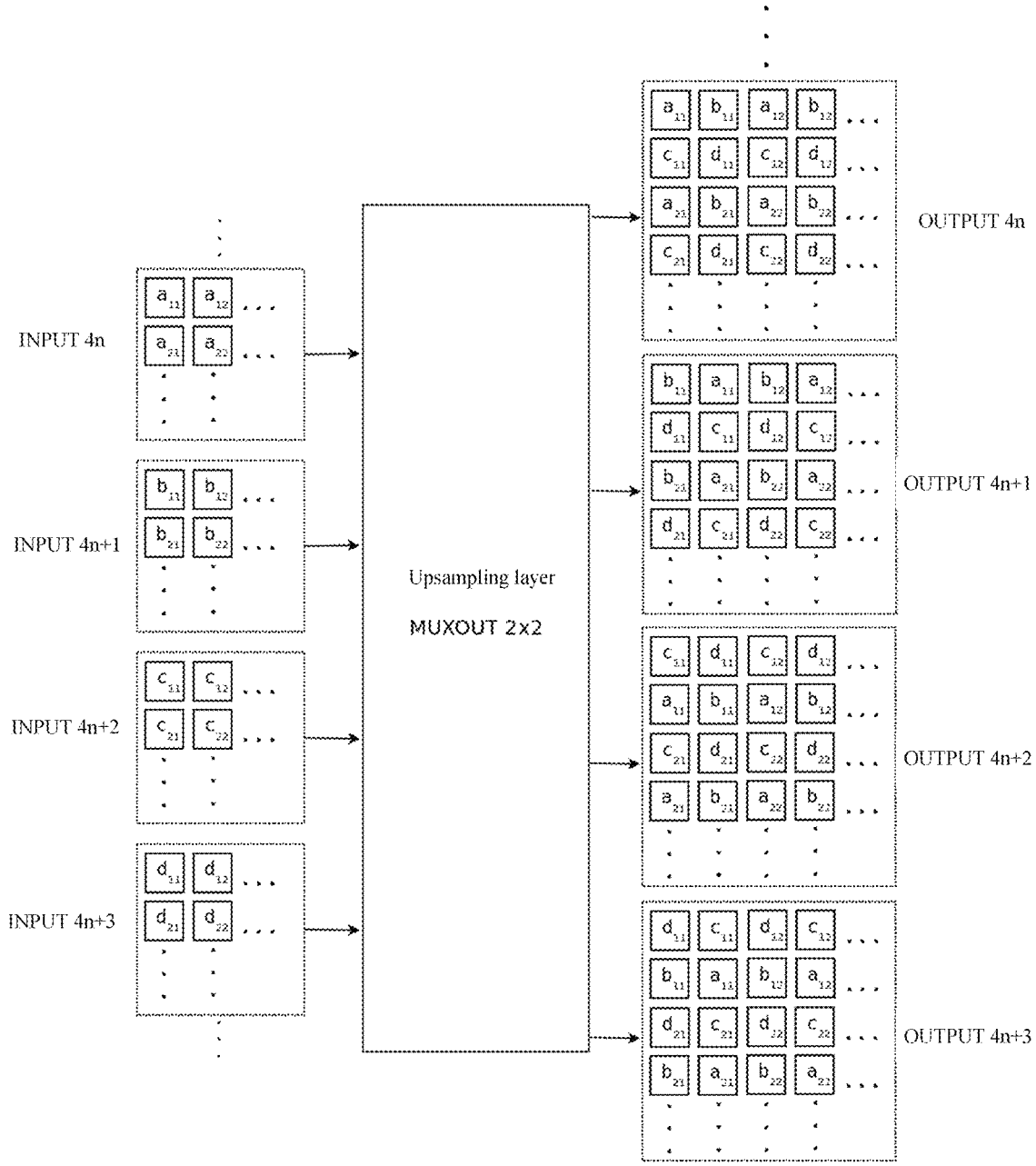
FIG. 11A shows a schematic diagram of an upsampling layer in a convolutional neural network.

FIG. 11A shows a schematic diagram of an upsampling layer in a convolutional neural network.

In this embodiment, the original convolutional neural network may include one upsampling layer (referred to as MUXOUT layer). The upsampling layer has the structure shown in FIG. 11A, and can upsample the input pixel, so as to obtain a higher resolution.

Specifically, as shown in FIG. 11A, a factor $M=M_x \times M_y$ of the MUXOUT layer is added with a resolution from the input feature $x_{i,j}^{c,L}$, i=0 ... H−1, j=0 ... W−1 to the output feature $y_{p,q}^{c,L}$ p=0 ... $M_y$H−1, q=0 ... $M_x$W−1. A universal definition to the MUXOUT layer is as follows.

First, $U^1, \ldots, U^M$ is an upsampling operator for copying pixels to different positions in features greater than 0:

$$y_{p,q}^{c,L} = U^n(x_{i,j}^{c,L}) = \begin{cases} x_{i,j}^{c,L} & \text{if } \begin{array}{l} i = M_y p + a \text{ and } j = M_x q + b \\ p = 0 \ldots M_y - 1, q = 0 \ldots M_x - 1 \\ a = (n-1)\% M_y, b = \lfloor (n-1)/M_y \rfloor \end{array} \\ 0 & \text{others} \end{cases}$$

where % is the "modulo" operator, and $\lfloor x \rfloor$ is the largest integer which is less than x, so that $n=M_y a+b+1$. The number of features that need to be inputted to the MUXOUT layer is a multiple of M, that is, C=G·M with an integer G. The output number of the features is unchanged, which is equal to c, wherein c denotes an ordinal number of input terminal, (p,q) denotes an inputted pixel. The features are processed with a set of M features, so the input and the output in the set are divided into: $x=[x^1 \ldots x^G]$ and $=[y^1 \ldots y^G]$. Then, the output of the MUXOUT layer may be written as:

$y^1 = U^1 x^1 + \ldots + U^M x^M$ $y^2 = U^2 x^1 + \ldots + U^1 x^M$ $y^G = U^M x^1 + \ldots + U^M x^M$ In the example of FIG. 11A, $M_y = M_x = 2$ (M=4).

Figure 11B:
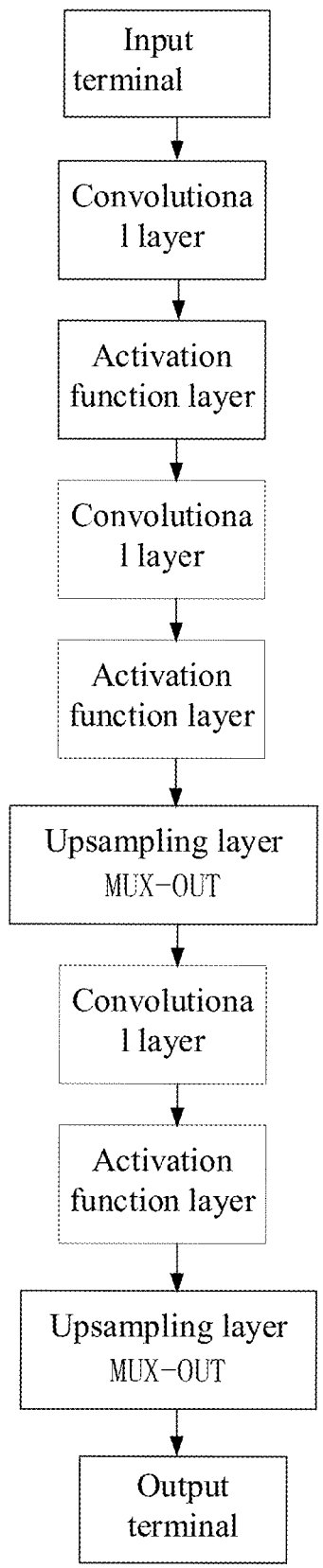
FIG. 11B shows an example of a position of adding the upsampling layer, MUXOUT layer, in a convolutional neural network.

FIG. 11B shows an example of the location where the upsampling layer, MUXOUT layer, is added in the convolutional neural network. However, this is merely exemplary, rather than restrictive. In fact, the upsampling layer, MUXOUT layer, may be placed at other positions.

In this way, the resolution is increased by adding the upsampling layer, the MUXOUT layer.

Figure 11C:
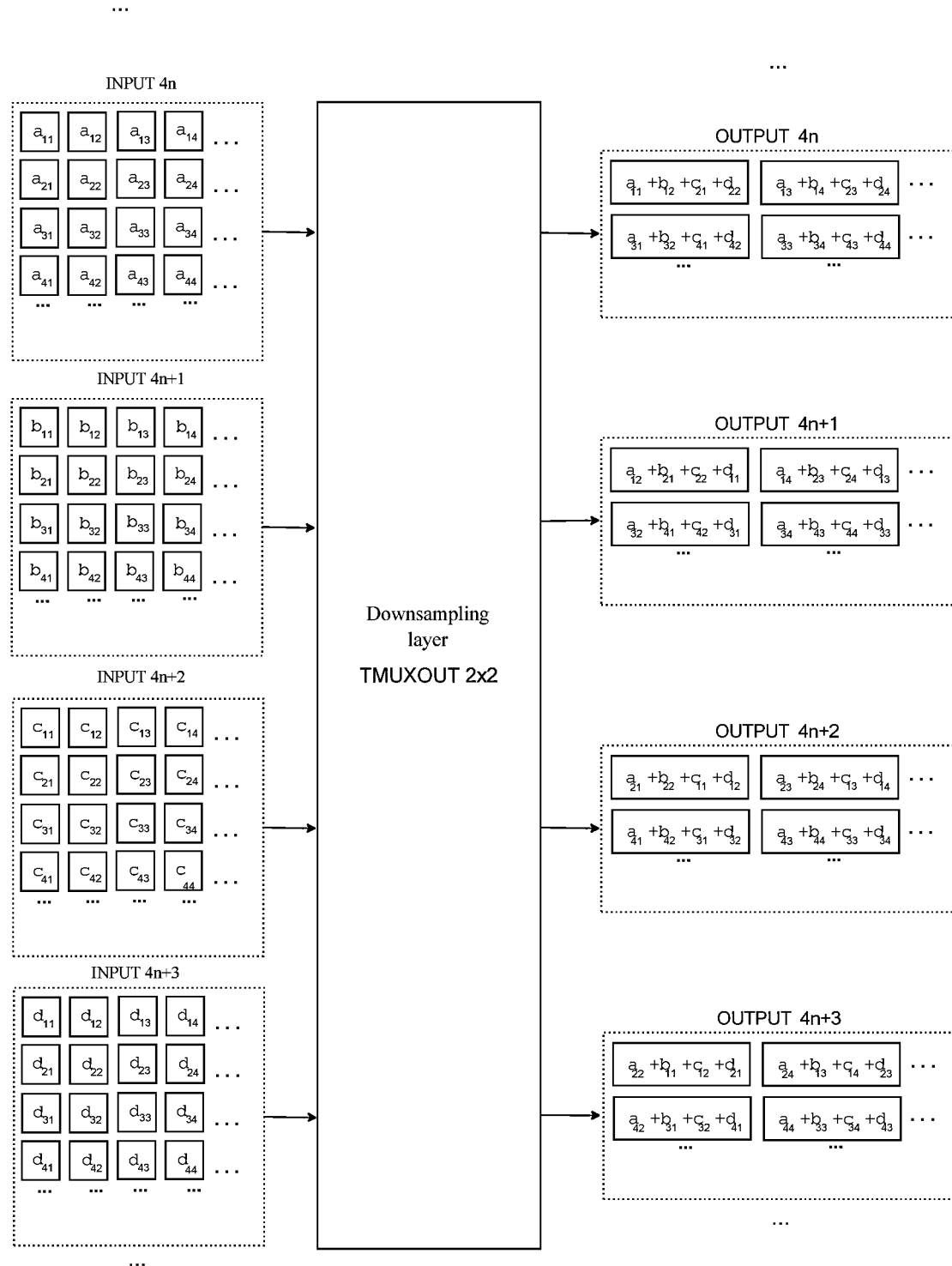
FIG. 11C shows a schematic diagram of a downsampling layer in a deconvolutional neural network.

FIG. 11C shows a schematic diagram of a downsampling layer in the deconvolutional neural network.

If an upsampling layer is added in the convolutional neural network, the upsampling layer should be also replaced with a downsampling layer corresponding to the upsampling layer in the corresponding deconvolutional network.

In other words, in a deconvolutional neural network, in addition to that the convolutional layer is changed into a deconvolutional layer, the pooling layer is changed into an unpooling layer, the upsampling layer is also changed into a downsampling layer.

Figure 12:
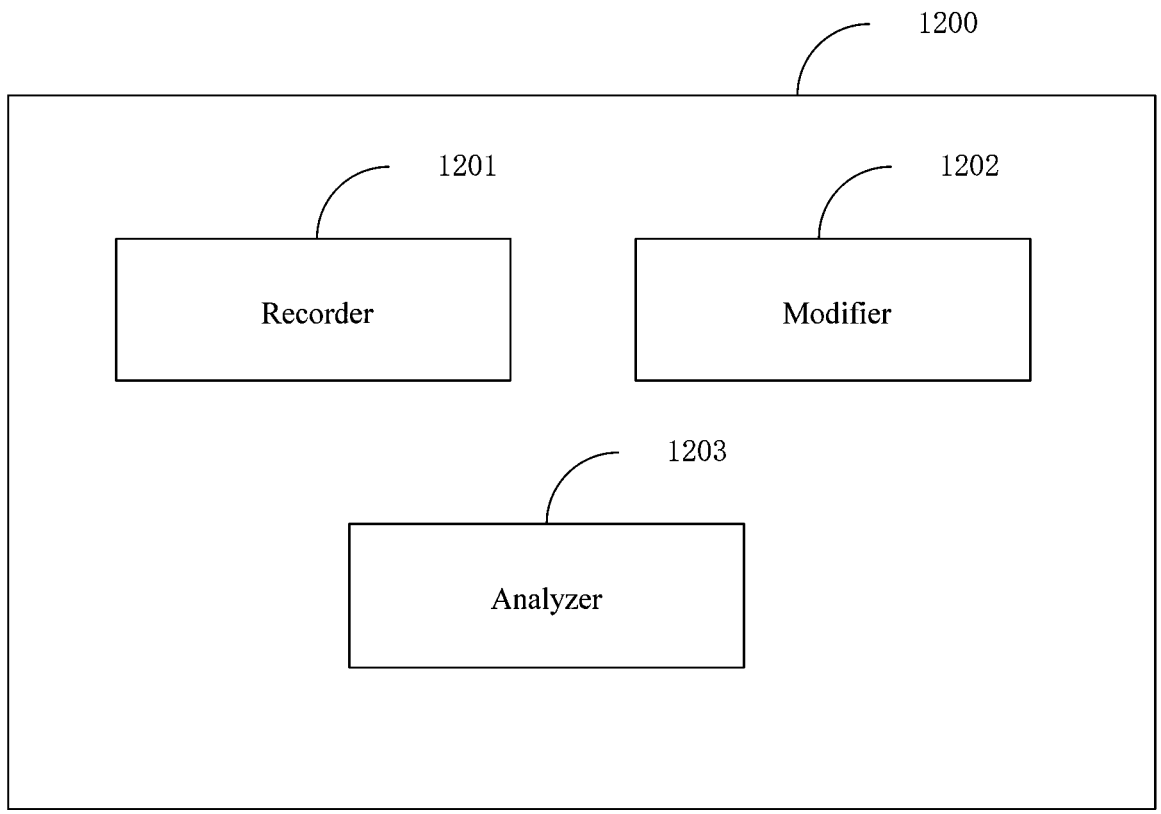
FIG. 12 shows a block diagram of a processing device for a convolutional neural network according to an embodiment of the present disclosure.

FIG. 12 shows a block diagram of a processing device 1200 for a convolutional neural network according to an embodiment of the present disclosure.

The processing device 1200 for a convolutional neural network shown in FIG. 12 comprises: a recorder 1201 configured to use an activation recorder layer as an activation function layer in the convolutional neural network, wherein in response to that a probe image with contents is inputted to the convolutional neural network, the recorder enables the activation recorder layer to perform an activation operation the same as the activation function layer does and record an activation result of the activation operation; a modifier 1202 configured to modify the convolutional neural network, wherein the step of modifying comprises replacing the activation recorder layer with a hidden layer that uses the recorded activation result; and an analyzer 1203 configured to input an analysis image to the modified convolutional neural network as an input image, so as to output an output image of the modified convolutional neural network, thereby analyzing a forward effect or a backward effect between the input image and the output image, the analysis image being a pixel-level binary image.

In an embodiment, the analyzer 1203 may be configured to: input an all-zero image to the modified convolutional neural network so as to output a first output value as a bias coefficient; input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a forward effect.

In an embodiment, the convolutional neural network may comprise an upsampling layer.

In an embodiment, the analyzer 1203 may be configured to: input an all-zero image to the modified convolutional neural network to output a first output value as a bias coefficient: input all possible different analysis images to the modified convolutional neural network to output an output image of the modified convolutional neural network based on the bias coefficient, the analysis image being a binary image that is 1 at a certain pixel and 0 at other pixels, and positions of the pixel that is 1 being different in different analysis images; and analyze correspondence between the analysis image and the output image at a pixel level, so as to obtain the effect of respective pixels of the output image of the modified convolutional neural network on respective pixels of the input image as a backward effect.

In an embodiment, the modifier 1202 may be configured to: configure a deconvolutional network as the modified convolutional neural network, the deconvolutional network being an inverse network of the convolutional neural network. The analyzer 1203 is configured to: input an all-zero image to the modified convolutional neural network so as to output a first output value as a bias coefficient; input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a backward effect.

In an embodiment, the convolutional neural network may comprise an upsampling layer, then the analyzer 1203 is configured to configure a deconvolutional network as the modified convolutional neural network through the following step: replacing the upsampling layer with a downsampling layer corresponding to the upsampling layer.

In this way, the activation recorder layer is used to record the activation result of the activation operation of the activation function layer that originally causes nonlinearity to the convolutional neural network, and the recorded activation result is fixed by using the hidden layer, so that the convolutional neural network is modified from nonlinear to linear, this allows for more stable follow-up analysis. Further, an analysis image that serves as a binary image of a pixel level is inputted to the modified convolutional neural network, the relationship between the inputted analysis image and the output image can be analyzed at the pixel level, thereby the forward effect or a backward effect between the input image and the output image of the convolutional neural network is obtained, so that guidance can be provided for how to make improvement with respect to the number of filters, parameters, etc. of the convolutional neural network.

Figure 13:
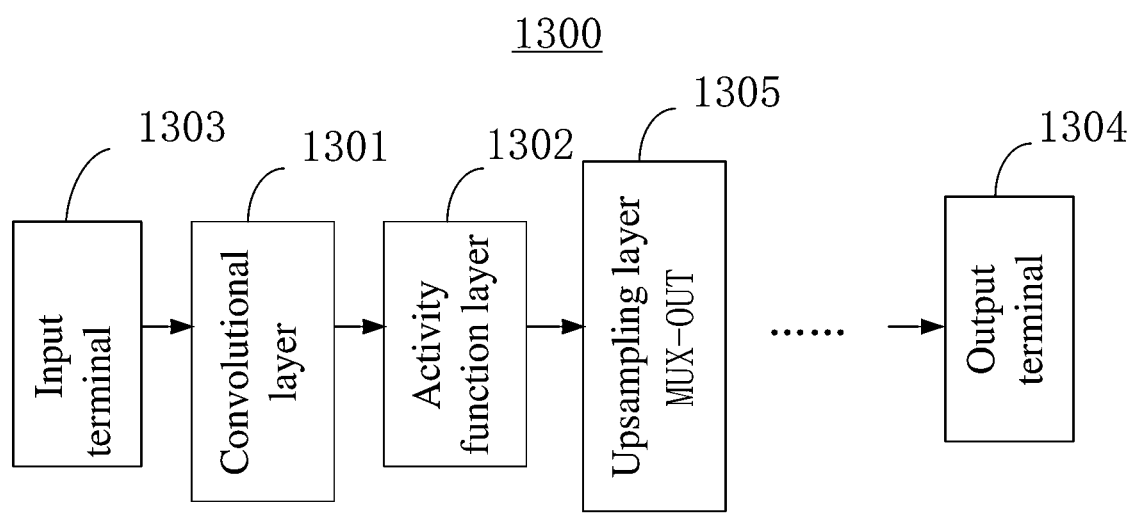
FIG. 13 shows a schematic diagram of a convolutional neural network according to an embodiment of the present disclosure.

FIG. 13 shows a schematic diagram of a convolutional neural network according to an embodiment of the present disclosure.

The convolutional neural network 1300 shown in FIG. 13 comprises: one or more convolutional layers 1301, 1301' . . . ; one or more hidden layers 1302, 1302' . . . corresponding to the one or more convolutional layers, and being used to replace corresponding one or more activation recorder layers, the one or more activation recorder layers serve as an activation function layer in the convolutional neural network, wherein in response to that a probe image with contents is inputted to the convolutional neural network, the one or more activation recorder layers perform an activation operation the same as the activation function layer does and record an activation result of the activation operation, the one or more hidden layers use the recorded activation result; an input terminal 1303 that receives one or more analysis images; and an output terminal 1304 that outputs an output image of the modified convolutional neural network, thereby analyzing a forward effect or a backward effect between the input image and the output image, the analysis image being a pixel-level binary image.

Herein, it is noted that, the activation function layer, the activation recorder layer, and the hidden layer exampled above may be one or multiple, respectively. In a case where the activation function layer, the activation recorder layer, and the hidden layer are multiple each, and they share one-to-one correspondence, i.e., for example, if there are three activation function layers, then there are three activation recorder layers to replace the original three activation function layers in one-to-one correspondence, and there are three hidden layers to replace the three activation recorder layers in one-to-one correspondence.

In an embodiment, before receiving the analysis images, the input terminal 1303 may receive an all-zero image so as to output a first output value from the output terminal as a bias coefficient; the input terminal 1303 may be configured to receive the one or more analysis images so as to output an output image of the modified convolutional neural network from the output terminal 1305 based on the bias coefficient, the analysis image being a binary image that is 1 at a certain pixel and 0 at other pixels; and correspondence between the analysis image and the output image at a pixel level is analyzed, so as to obtain the effect of respective pixels of the input image of the modified convolutional neural network on respective pixels of the output image as a forward effect.

In an embodiment, the convolutional neural network 1300 further comprises an upsampling layer 1305. Positions of the upsampling layer are merely exemplary, rather than restrictive. In fact, the upsampling layer may be placed at other positions.

In an embodiment, before receiving the analysis images, the input terminal 1303 may receive an all-zero image so as to output a first output value as a bias coefficient; the input terminal 1303 may receive all possible different analysis images to output an output image of the modified convolutional neural network from the output terminal 1304 based on the bias coefficient, the analysis image being a binary image that is 1 at a certain pixel and 0 at other pixels, and positions of the pixel that is 1 being different in different analysis images; and correspondence between the analysis image and the output image at a pixel level is analyzed, so as to obtain the effect of respective pixels of the output image of the convolutional neural network on respective pixels of the input image as a backward effect.

In an embodiment, the convolutional neural network 1300 may be replaced with a deconvolutional network as the modified convolutional neural network, the deconvolutional network is an inverse network of the convolutional neural network, the input terminal 1303 is replaced with an output terminal of the modified convolutional neural network, and the output terminal 1304 is replaced with an input terminal of the modified convolutional neural network; the input terminal of the modified convolutional neural network receives an all-zero image so as to output a first output value from the output terminal of the modified convolutional neural network as a bias coefficient; the input terminal of the modified convolutional neural network receives one or more analysis images so as to output an output image of the modified convolutional neural network based on the bias coefficient, the analysis image being a binary image that is 1 at a certain pixel and 0 at other pixels; and correspondence between the analysis image and the output image at a pixel level is analyzed, so as to obtain the effect of respective pixels of the input image of the modified convolutional neural network on respective pixels of the output image as a backward effect.

In an embodiment, the convolutional neural network 1300 may further comprise an upsampling layer 1305, wherein the upsampling layer 1305 is replaced with a downsampling layer corresponding to the upsampling layer 1305 in the deconvolutional network.

In this way, the activation recorder layer is used to record the activation result of the activation operation of the activation function layer that originally causes nonlinearity to the convolutional neural network, and the recorded activation result is fixed by using the hidden layer, so that the convolutional neural network is modified from nonlinear to linear, this allows for more stable follow-up analysis. Further, an analysis image that serves as a binary image of a pixel level is inputted to the modified convolutional neural network, the relationship between the inputted analysis image and the output image can be analyzed at the pixel level, thereby the forward effect or a backward effect between the input image and the output image of the convolutional neural network is obtained, so that guidance can be provided for how to make improvement with respect to the number of filters, parameters, etc. of the convolutional neural network.

Figure 14:
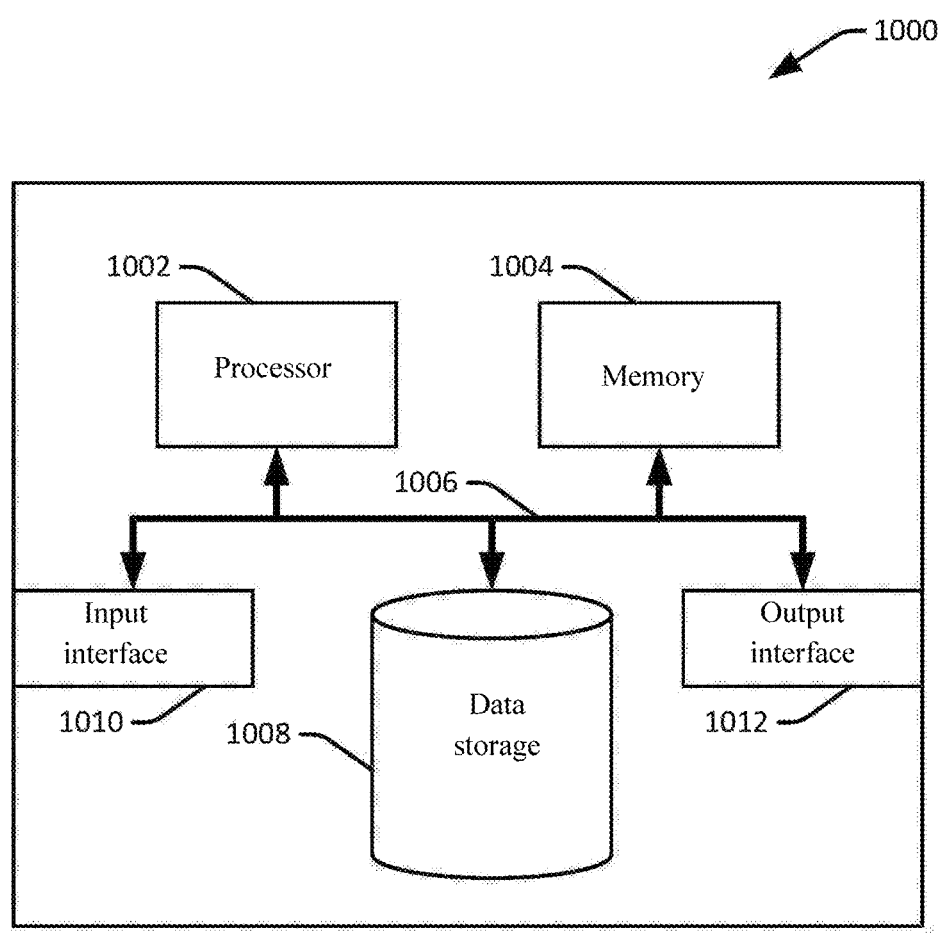
FIG. 14 illustrates an exemplary processing system that may be used to implement the processing method of the present disclosure.

FIG. 14 illustrates an exemplary processing system that may be used to implement the processing method of the present disclosure.

The processing system 1000 comprises at least one processor 1002 that executes instructions stored in a memory 1004. These instructions may be, for example, instructions for implementing the functions described as being performed by one or more of the modules described above, or instructions for implementing one or more steps in the methods described above. The processor 1002 may access the memory 1004 through a system bus 1006. In addition to storing executable instructions, the memory 1004 may also store training data and the like. The processor 1002 may be a variety of devices with computing capability such as CPU or GPU. The CPU may be an X86 or an ARM processor, the GPU may be integrated directly on the motherboard, or it may be built into North Bridge chip of the motherboard, or it may be built into the CPU.

The processing system 1000 further comprises a data storage 1008 that is accessible by the processor 1002 via the system bus 1006. The data storage 1008 may include executable instructions, multi-image training data, and the like. The processing system 1000 further comprises an input interface 1010 that allows external devices to communicate with the processing system 1000. For example, the input interface 1010 may be used to receive instructions from an external computer device, from a user, or the like. The processing system 1000 may also comprise an output interface 1012 that interfaces the processing system 1000 with one or more external devices. For example, the processing system 1000 may display an image or the like through the output interface 1012. It is contemplated that an external device that communicates with the processing system 1000 through the input interface 1010 and the output interface 1012 may be included in an environment that provides virtually any type of user interface with which the user can interact. Examples of types of user interface include graphical user interfaces, natural user interfaces, and the like. For example, the graphical user interface may receive an input from a user using an input device such as a keyboard, a mouse, a remote controller, etc., and provide an output on an output device such as a display. In addition, the natural language interface may enable the user to interact with the processing system 1000 without being constrained by an input device such as a keyboard, a mouse, a remote controller, etc. In contrast, the natural user interface may rely on speech recognition, touch and stylus recognition, gesture recognition on and near the screen, aerial gesture, head and eye tracking, voice and speech, vision, touch, gesture, and machine intelligence.

In addition, although the processing system 1000 is shown as a single system in the drawings, it is understood that the processing system 1000 may also be a distributed system and may also be arranged as a cloud facility (including public cloud or private cloud). Thus, for example, several devices may communicate over a network connection and may perform tasks described as being performed by the processing system 1000 collectively.

The various functions described herein (including but not limited to convolutional neural network modules, selection modules, etc.) may be implemented in hardware, software, firmware, or any combination thereof. If implemented in software, the functions may be stored on a computer-readable medium as one or more instructions or transmitted thereby. The computer-readable medium includes a computer-readable storage medium. The computer-readable storage medium may be any available storage medium that can be accessed by a computer. By way of example, rather than restrictive, such computer-readable medium may include RAM, ROM, EEPROM, CD-ROM, or other optical disk storage, magnetic disk storage, other magnetic storage devices, or any other medium that may be used to carry or store instructions or desired program codes in data structure forms and can be accessed by a computer. In addition, a propagated signal is not included in the scope of computer-readable storage medium. The computer-readable medium also includes communication medium, including any medium that facilitates transfer of a computer program from one place to another. The connection may be, for example, a communication medium. For example, if the software uses coaxial cable, fiber optic cable, twisted pair, digital subscriber line (DSL), or wireless technology such as infrared, radio, and microwave to transmit from a web site, a server, or other remote source, then said coaxial cable, fiber optic cable, twisted pair, DSL, or wireless technology such as infrared, radio, and microwave are included in the definition of communication medium. Combinations of them should also be included within the scope of computer-readable medium. Alternately, the functions described herein may be performed at least in part by one or more hardware logic components. For example, illustrative types of hardware logic components that may be used include field programmable gate arrays (FPGA), program-specific integrated circuits (ASIC), program-specific standard products (ASSP), system-on-chip (SOC), and complex programmable logic Devices (CPLD), etc.

The above description is merely exemplary embodiments of the present disclosure and is not intended to limit the scope of the present disclosure. The protection scope of the present disclosure is defined by the appended claims.

What is claimed is:

1. A processing method for a convolutional neural network, comprising steps of:

using an activation recorder layer as an activation function layer in the convolutional neural network, wherein in response to that a probe image with contents is inputted to the convolutional neural network, the activation recorder layer performs an activation operation the same as the activation function layer does and records an activation result of the activation operation;

modifying the convolutional neural network, wherein step of modifying comprises replacing the activation recorder layer with a hidden layer that uses the recorded activation result; and inputting an analysis image to the modified convolutional neural network as an input image, so as to output an output image of the modified convolutional neural network, thereby analyzing a forward effect or a backward effect between the input image and the output image, the analysis image being a pixel-level binary image.

2. The processing method of claim 1, wherein step of inputting an analysis image to the modified convolutional neural network as an input image, so as to obtain an analysis result, thereby analyzing a forward effect between the input image and the output image of the convolutional neural network before modification comprises:

inputting an all-zero image to the modified convolutional neural network so as to output a first output value as a bias coefficient;

inputting one or more analysis images to the modified convolutional neural network so as to output an output image of the modified convolutional neural network based on the bias coefficient, the analysis image being a binary image that is 1 at a certain pixel and 0 at other pixels; and analyzing correspondence between the analysis image and the output image at a pixel level, so as to obtain the effect of respective pixels of the input image of the modified convolutional neural network on respective pixels of the output image as a forward effect.

3. The processing method of claim 1, wherein the convolutional neural network comprises an upsampling layer.

4. The processing method of claim 1, wherein step of inputting an analysis image to the modified convolutional neural network as an input image, so as to obtain an analysis result, thereby analyzing a backward effect between the input image and the output image of the convolutional neural network before modification comprises:

inputting an all-zero image to the modified convolutional neural network to output a first output value as a bias coefficient;

inputting all possible different analysis images to the modified convolutional neural network to output an output image of the modified convolutional neural network based on the bias coefficient, the analysis image being a binary image that is 1 at a certain pixel and 0 at other pixels, and positions of the pixel that is 1 being different in different analysis images; and analyzing correspondence between the analysis image and the output image at a pixel level, so as to obtain the effect of respective pixels of the output image of the convolutional neural network on respective pixels of the input image as a backward effect.

5. The processing method of claim 1, wherein step of modifying the convolutional neural network comprises replacing the activation recorder layer with a hidden layer that uses the recorded activation result comprises:

configuring a deconvolutional network as the modified convolutional neural network, the deconvolutional network being an inverse network of the convolutional neural network, step of inputting an analysis image to the modified convolutional neural network as an input image, so as to obtain an analysis result, thereby analyzing a backward effect between the input image and the output image of the convolutional neural network before modification comprises:

inputting an all-zero image to the modified convolutional neural network so as to output a first output value as a bias coefficient;

inputting one or more analysis images to the modified convolutional neural network so as to output an output image of the modified convolutional neural network based on the bias coefficient, the analysis image being a binary image that is 1 at a certain pixel and 0 at other pixels; and analyzing correspondence between the analysis image and the output image at a pixel level, so as to obtain the effect of respective pixels of the input image of the modified convolutional neural network on respective pixels of the output image as a backward effect.

6. The processing method of claim 5, wherein the convolutional neural network comprises an upsampling layer, and configuring a deconvolutional network as the modified convolutional neural network comprises:

replacing the upsampling layer with a downsampling layer corresponding to the upsampling layer.

7. A processing device for a convolutional neural network, comprising:

a recorder, configured to use an activation recorder layer as an activation function layer in the convolutional neural network, wherein in response to that a probe image with contents is inputted to the convolutional neural network, the recorder enables the activation recorder layer to perform an activation operation the same as the activation function layer does and record an activation result of the activation operation;

a modifier, configured to modify the convolutional neural network, wherein step of modifying comprises replacing the activation recorder layer with a hidden layer that uses the recorded activation result; and an analyzer, configured to input an analysis image to the modified convolutional neural network as an input image, so as to output an output image of the modified convolutional neural network, thereby analyzing a forward effect or a backward effect between the input image and the output image, the analysis image being a pixel-level binary image.

8. The processing device of claim 7, wherein the analyzer is configured to:

input an all-zero image to the modified convolutional neural network so as to output a first output value as a bias coefficient;

input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a forward effect.

9. The processing device of claim 7, wherein the convolutional neural network comprises an upsampling layer.

10. The processing device of claim 7, wherein the analyzer is configured to:

input an all-zero image to the modified convolutional neural network to output a first output value as a bias coefficient;

input all possible different analysis images to the modified convolutional neural network to output an output image of the modified convolutional neural network based on the bias coefficient, the analysis image being a binary image that is 1 at a certain pixel and 0 at other pixels, and positions of the pixel that is 1 being different in different analysis images; and analyze correspondence between the analysis image and the output image at a pixel level, so as to obtain the effect of respective pixels of the output image of the convolutional neural network on respective pixels of the input image as a backward effect.

11. The processing device of claim 7, wherein the modifier is configured to:

configure a deconvolutional network as the modified convolutional neural network, the deconvolutional network being an inverse network of the convolutional neural network, the analyzer is configured to:

input an all-zero image to the modified convolutional neural network so as to output a first output value as a bias coefficient;

input one or more analysis images to the modified convolutional neural network so as to output an output image of the modified convolutional neural network based on the bias coefficient, the analysis image being a binary image that is 1 at a certain pixel and 0 at other pixels; and analyze correspondence between the analysis image and the output image at a pixel level, so as to obtain the effect of respective pixels of the input image of the modified convolutional neural network on respective pixels of the output image as a backward effect.

12. The processing device of claim 11, wherein the convolutional neural network comprises an upsampling layer, and the analyzer is configured to configure a deconvolutional network as the modified convolutional neural network through the following step:

replacing the upsampling layer with a downsampling layer corresponding to the upsampling layer.

13. A processing system for a convolutional neural network, comprising:

one or more processors;

one or more memories in which computer-readable codes are stored, the computer-readable codes being capable of causing, when executed by the one or more processors, the processing method of claim 1 to be executed.

14. A convolutional neural network, comprising:
one or more convolutional layers;
one or more hidden layers corresponding to the one or more convolutional layers, the one or more hidden layers being used to replace corresponding one or more activation recorder layers, the one or more activation recorder layers serving as an activation function layer in the convolutional neural network, wherein in response to that a probe image with contents is inputted to the convolutional neural network, the one or more activation recorder layers perform an activation operation the same as the activation function layer does and record an activation result of the activation operation, the one or more hidden layers use the recorded activation result;
an input terminal that receives one or more analysis images; and
on output terminal that outputs an output image of the modified convolutional neural network, thereby analyzing a forward effect or a backward effect between the input image and the output image, the analysis image being a pixel-level binary image.

15. The convolutional neural network of claim 14, wherein before receiving the analysis images, the input terminal receives an all-zero image so as to output a first output value from the output terminal as a bias coefficient;
the input terminal is configured to receive the one or more analysis images so as to output an output image of the modified convolutional neural network from the output terminal based on the bias coefficient, the analysis image being a binary image that is 1 at a certain pixel and 0 at other pixels; and
correspondence between the analysis image and the output image at a pixel level is analyzed, so as to obtain the effect of respective pixels of the input image of the modified convolutional neural network on respective pixels of the output image as a forward effect.

16. The convolutional neural network of claim 14, further comprising an upsampling layer.

17. The convolutional neural network of claim 14, wherein before receiving the analysis images, the input terminal receives an all-zero image to output a first output value from the output terminal as a bias coefficient;
the input terminal receives all possible different analysis images to output an output image of the modified convolutional neural network from the output terminal based on the bias coefficient, the analysis image being a binary image that is 1 at a certain pixel and 0 at other pixels, and positions of the pixel that is 1 being different in different analysis images; and
correspondence between the analysis image and the output image at a pixel level is analyzed, so as to obtain the effect of respective pixels of the output image of the modified convolutional neural network on respective pixels of the input image as a backward effect.

18. The convolutional neural network of claim 14, wherein the convolutional neural network may be replaced with a deconvolutional network as the modified convolutional neural network, the deconvolutional network is an inverse network of the convolutional neural network, the input terminal is replaced with an output terminal of the modified convolutional neural network, and the output terminal is replaced with an input terminal of the modified convolutional neural network;
the input terminal of the modified convolutional neural network receives an all-zero image so as to output a first output value from the output terminal of the modified convolutional neural network as a bias coefficient;
the input terminal of the modified convolutional neural network receives one or more analysis images so as to output an output image of the modified convolutional neural network based on the bias coefficient, the analysis image being a binary image that is 1 at a certain pixel and 0 at other pixels; and
correspondence between the analysis image and the output image at a pixel level is analyzed, so as to obtain the effect of respective pixels of the input image of the modified convolutional neural network on respective pixels of the output image as a backward effect.

19. The convolutional neural network of claim 18, further comprising an upsampling layer, wherein the upsampling layer is replaced with a downsampling layer corresponding to the upsampling layer in the deconvolutional network.

20. A non-transitory computer storage medium for storing computer-readable codes capable of causing, when executed by one or more processors, the processing method of claim 1 to be executed.

\* \* \* \* \*